(12) United States Patent
Shaffer et al.

(10) Patent No.: US 8,649,492 B2
(45) Date of Patent: Feb. 11, 2014

(54) FLOOR CONTROL BASED MIXING AND SWITCHING OF MEDIA

(75) Inventors: Shmuel Shaffer, Palo Alto, CA (US); Larry Raymond Metzger, Wake Forest, NC (US); Michael P. O'Brien, Manasquan, NJ (US); Gordon Rex Earl, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 1634 days.

(21) Appl. No.: 11/481,094

(22) Filed: Jul. 5, 2006

(65) Prior Publication Data

US 2008/0037750 A1   Feb. 14, 2008

(51) Int. Cl.
*H04M 3/00* (2006.01)
*H04M 5/16* (2006.01)
*H04Q 11/00* (2006.01)
*H04L 12/16* (2006.01)

(52) U.S. Cl.
USPC ................ 379/202.01; 370/260; 370/263

(58) Field of Classification Search
USPC ........ 370/260, 261, 263; 379/202.01, 203.01, 379/204.01
See application file for complete search history.

(56) References Cited

U.S. PATENT DOCUMENTS

| | | | |
|---|---|---|---|
| 5,953,049 A * | 9/1999 | Horn et al. ................. | 379/93.21 |
| 7,085,244 B2 * | 8/2006 | Koskelainen et al. ........ | 370/261 |
| 7,599,834 B2 * | 10/2009 | Raad et al. .................... | 704/219 |
| 7,636,327 B1 * | 12/2009 | Doran ........................... | 370/276 |
| 2006/0056440 A1 * | 3/2006 | Khartabil ....................... | 370/260 |
| 2006/0229093 A1 * | 10/2006 | Bhutiani et al. .............. | 455/518 |

OTHER PUBLICATIONS

Perkins, Mark E., et al.; "Characterizing the Subjective Performance of the ITU-T 8 kb/s Speech Coding Algorithm—ITU-T G.729" IEEE Communications Magazine, Sep. 1997.

* cited by examiner

*Primary Examiner* — Ahmad Matar
*Assistant Examiner* — Nafiz E Hoque
(74) *Attorney, Agent, or Firm* — Fish & Richardson P.C.

(57) ABSTRACT

In one embodiment, techniques for optimizing voice quality for a media stream provided to participants in a conference are provided. A first path is provided that provides an unmixed path of media from a first user to participants in the conference. A second path includes a mixed path of media from multiple users. The mixed path may include media from a first user and a second user that is mixed. The mixed path may include a transcoding from a first compression to a second compression, and back to the first compression (or another compression). A floor control module may switch between the first path and the second path to optimize voice quality.

11 Claims, 4 Drawing Sheets

FLOOR CONTROL BASED MIXING AND SWITCHING OF MEDIA

BACKGROUND OF THE INVENTION

Embodiments of the present invention generally relate to telecommunications and more specifically to techniques for optimizing voice quality for a media stream in a conference.

In a conference, participants may use end-points that send media using different compressions, such as G.729, G.723, etc. The various media streams from the participants are mixed and sent to each participant in a conference. Mixers may use algorithms to select the media to be mixed. For example, mixers may mix the top speakers or last N speakers, etc.

The mixer typically mixes the various media streams in the linear pulse code modulation (PCM) domain, i.e., G.711. Thus, if a media stream from a user is compressed using a G.729 CODEC, the G.729 media stream, when received for mixing, is transcoded to G.711. The G.711 media stream is then mixed with other media streams that have been transcoded to G.711, and then the mixed stream is transcoded back to G.729 (or any other compression). The G.729 mixed media stream is subsequently sent to the participants.

The transcoding from G.729 to G.711 and back to G.729 degrades the voice quality. For example, a mean opinion score (MOS) may be reduced. The MOS provides a numerical indication of the perceived quality of received voice. Typically, the MOS is expressed as a number between a range of 1 to 5, where 1 is the lowest perceived quality and 5 is the highest perceived quality. For example, G.729 may have a MOS of 3.92. However, when the media stream is transcoded from G.729 to G.711 and back to G.729, the MOS may be 3.27. Thus, the MOS for the transcoding is 0.65 less than the G.729 media stream without the transcoding. On average, most humans can notice a 0.2 difference in MOSs. Thus, this difference is 3 times the normal noticeable degradation that humans can perceive in voice quality. Accordingly, the degradation in voice quality in a conference where media streams are transcoded to another compression may be very noticeable to participants.

DETAILED DESCRIPTION OF EMBODIMENTS OF THE INVENTION

Embodiments of the present invention provide techniques for optimizing voice quality for a media stream provided to participants in a conference. A first path provides an unmixed path of media from a first user to participants in the conference. A second path provides a mixed path of media from multiple users. The mixed path may include media from a first user and a second user that is transcoded from a first compression to a second compression, mixed, and transcoded back to the first compression (or another compression). For example, media may be transcoded from G.723 to G.711, where it is mixed with another media stream at G.711, and then transcoded back to G.723.

In one embodiment, switching information is received based on a request to talk in a conference. It is then determined if the first path or the second path should be sent to participants based on the switching information. For example, the first path may be sent if only one user has been granted floor control. However, if multiple users have been granted floor control, the second path of a mixed media stream from multiple users should be sent to the participants. The switching between the first path and the second path is performed in a way that optimizes voice quality.

The voice quality may be optimized in that an unmixed path may be sent to participants in a conference when it is not necessary to mix multiple media streams from users (e.g., when only one user has floor control). However, when mixing is necessary, then the mixing may be performed and a mixed media stream is sent to the participants in the conference. In one embodiment, the mixing may degrade voice quality because it is transcoded from a first compression to a second compression and then back to the first compression. Each transcoding between compressions degrades voice quality as measured by a MOS. Thus, two transcodings degrade the voice quality twice. Embodiments of the present invention do not transcode media streams when it is not necessary, which optimizes voice quality in the push to talk virtual talk group (VTG).

Figure 1:
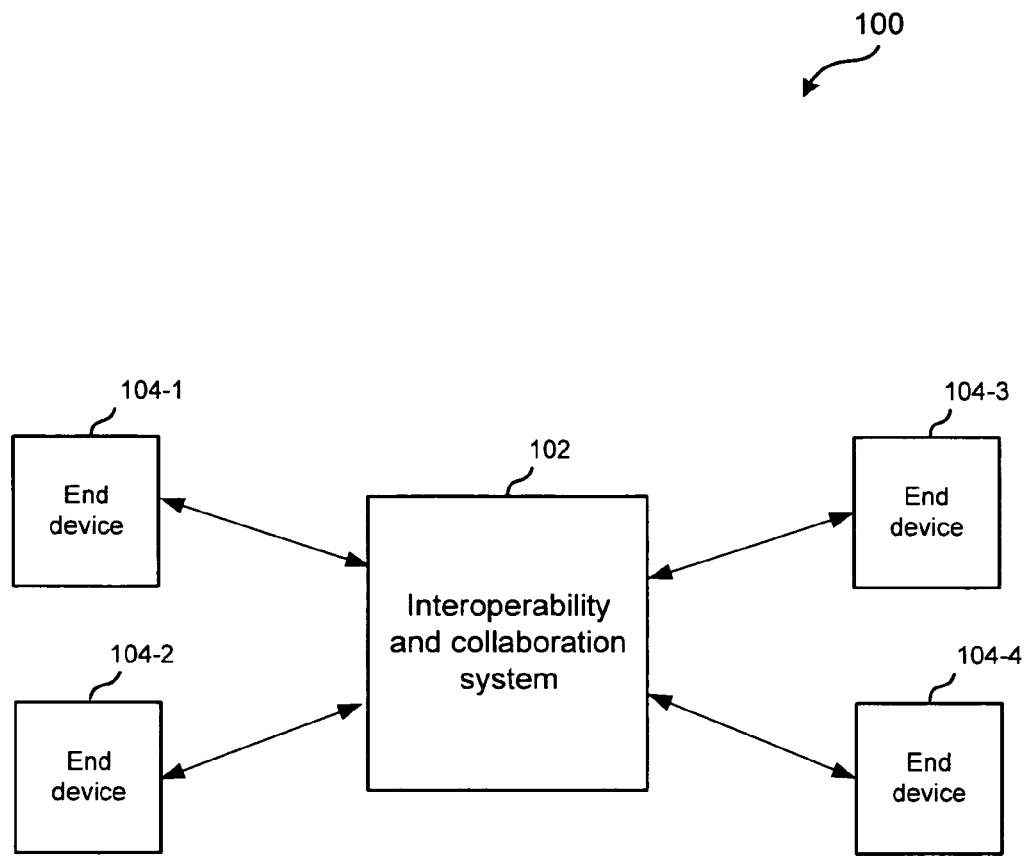
FIG. 1 depicts a simplified system according to one embodiment of the present invention.

FIG. 1 depicts a simplified system 100 according to one embodiment of the present invention. As shown, system 100 includes an interoperability and collaboration system 102 and end devices 104.

End devices 104 may be any devices that can send a media stream. In one embodiment, end devices 104 may be used by users to send voice. Also, the media streams may include other information, such as data, graphics, video, signaling, music, etc. End devices 104 may be telephonic devices, such as radios, cellular phones, PSTN telephones, voice enabled instant message clients, soft phones, computers, personal digital assistants (PDAs), etc. End devices 104 may also include other networking devices found in the network, such as routers, switches, etc.

In one embodiment, end devices 104 may include devices in which users use push-to-talk (PTT) when they want to talk in a push to talk environment. In the push to talk environment, a virtual talk group (VTG) may be formed. The virtual talk group allows a group of users to talk amongst each other using push to talk. The VTG may be similar to a conference call. When the push to talk button is selected, this indicates the user is requesting floor control. A request for floor control is sent and if floor control is granted, the user is allowed to talk. A VTG may include two or more end devices 104 that are communicating. As shown, four end devices 104 are participating in a conference.

In push-to-talk, a user presses or selects a push-to-talk mechanism when the user wants to talk or gain floor control. For example, a button may be provided in which the user pushes the button when the user wants to talk. Also, other mechanisms may be used, such as the user may select a key on a cellular phone, a voice command is used, a soft button is selected on a graphical user interface (GUI), etc. Although push-to-talk is described, it will be understood that any mechanism that indicates a user wants to talk in a conference may be used. For example, end device 104 may detect that a user is speaking and then send an indication that the user wants to talk. Also, a command from a user does not need to be received. For example, a network device may intelligently decide that a user wants to talk. In yet another scenario, the user may use device 104-1 to talk while using device 104-2 for the PTT functionality wherein the user indicates that he/she wants to gain floor control.

In one embodiment, as will be described below, signaling from end devices 104 indicates a user wants to gain floor control and to talk in a conference is used to determine whether a first path or a second path should be sent to participants in the VTG. The signaling may be any control information. For example, the signaling may be call control information that is sent from end device 104 when a push-to-talk button is selected.

Interoperability and collaboration system 102 is configured to determine which path should be sent based using floor control. In one embodiment, floor control is used to determine which users are allowed to speak during a conference. For example, a user with floor control is allowed to speak. Rules may be used to determine if only that user can have the floor control or if multiple users can have it when a user requests to talk.

Interoperability and collaboration system 102 is configured to switch between path #1 and path #2 based on which user/users have the floor control. For example, if only one user has floor control, then path #1 is used. If multiple users have floor control, then path #2 is used.

Figure 2:
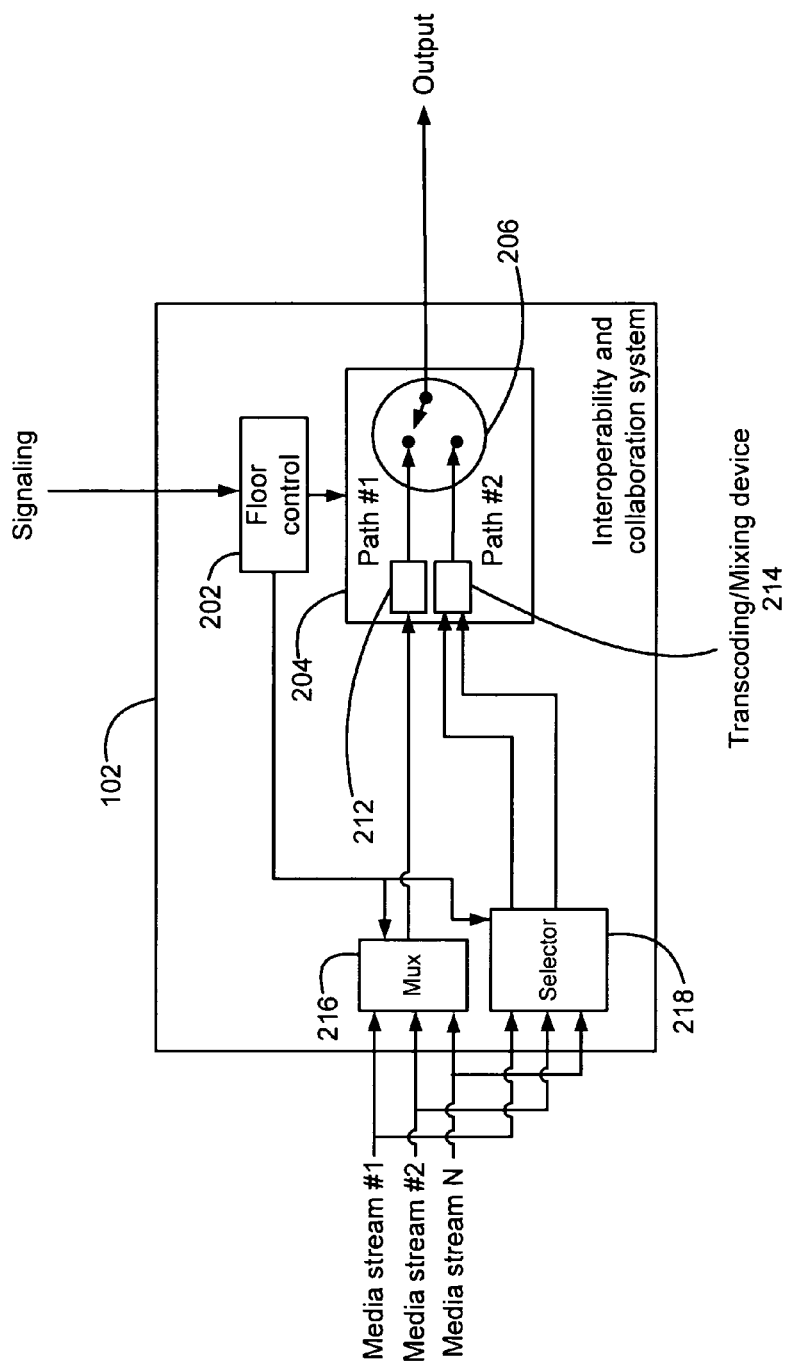
FIG. 2 depicts an embodiment of an interoperability and collaboration system according to embodiments of the present invention.

FIG. 2 depicts a more detailed embodiment of interoperability and collaboration system 102 according to embodiments of the present invention. As shown, interoperability and collaboration system 102 includes a floor control module 202, a mixer 204 a switch 206, a multiplexer 216, and a selector 218.

Floor control module 202 receives signaling. The signaling may indicate which users wish to speak in the conference. For example, when a user uses a push-to-talk option on end device 104-1, an indication is sent that indicates the user wants to talk. Floor control module 202 receives the signaling for the request and then is configured to determine which path should be selected.

Media streams #1-N may be received at multiplexer 216. The media streams may be media from an N number of users. At any time, any number of users may use the push-to-talk option. When a single user has requested to talk and is granted floor control, multiplexer 216 may select a single path to send to switch 206. When multiple users have requested to talk and are granted floor control, selector 218 can select media streams to send to switch 206 for mixing. In one embodiment, signaling may be used by multiplexer 216 and selector 218 to determine which media streams are sent to switch 206. For example, signaling for which end devices 104 are granted floor control is sent to multiplexer 216 and selector 218. The signaling is then used to determine which media streams to send to switch 206. Although the above method of sending media streams to switch 206 is described, it will be recognized that variations of sending media streams to switch 206 will be appreciated.

As shown, switch 206 may switch between a path #1 and a path #2. Although switch 206 is shown, it will be recognized that variations of switch 206 will be appreciated. A person skilled in the art will appreciate various methods (and physical designs) of switching between paths. The switching may be performed in hardware, software, optically, or with any other switching technology or combination of technologies.

As described above, path #1 is an unmixed media stream and path #2 is a transcoded media stream where media streams are transcoded from a first compression to a second compression, mixed, and the mixed media stream is transcoded back to the first compression. At different times in the conference, there may be a single user who has floor control or multiple users may have floor control. If floor control module 202 determines a single user has floor control, then switch 206 may be configured to send path #1. If floor control module 202 determines multiple users have floor control, then switch 206 may be configured to send path #2.

During the conference, the media sent to participants may be switched between path #1 and path #2. Because the transcoding between compressions may take some time, path #1 takes a compressed input media stream, such as a G.729 media stream, and introduces a delay 212 that matches a delay introduced into path #2 by the transcodings and mixing. For example, the delay introduced by the transcoding provided in transcoding/mixing device 214 may vary depending on the CODEC used. For example, some CODECs may take 32 milliseconds to convert a G.729 media stream to G.711, 3 milliseconds to mix a signal, and another 32 milliseconds to convert it back to G.729. Thus, a total of 67 milliseconds of delay may be introduced into path #2. Thus, a delay of substantially 67 milliseconds may then be introduced into path #1 such that a smooth transition between path #1 and path #2 is provided when the paths are switched between.

At different times, floor control module 202 may use push to talk signaling received from end devices 104 to determine which path to use. For example, if the push to talk signaling indicates that only one user has requested to talk (e.g., only one user is pressing the push-to-talk button on end device 104-1) and the user has been granted floor control, then mixing of media streams is not needed and thus any transcoding of media streams does not need to be performed. Accordingly, floor control module 202 causes mixer 204 to send path #1. Path #1 thus sends the media stream from the single person has floor at the time.

If two users are requesting to talk and are granted floor control, then the media streams from both users should be mixed. This is assuming that the floor control rules indicate that two users are allowed to speak at the same time but there may be cases where push to talk signaling indicates two users are requesting to speak, but one of the user's requests is rejected. This situation will be described in more detail below; however, for this example, it is assumed that the two users requesting to talk are allowed to talk at the same time and are granted floor control. Accordingly, floor control module 202 causes mixer 204 to utilize path #2. The two media streams are transcoded to G.711, mixed, recompressed, and then sent.

When a push to talk release signal is received that indicates a second user no longer requests/wants to speak in the conference, the floor control for the second user is removed. Then, floor control module 202 causes mixer 204 to switch back to path #1. The mixing does not need to be performed anymore as only a single user is speaking and has floor control.

Accordingly, voice quality is optimized by switching between path #1 and path #2. The voice quality of path #1 may be better (as measured by a MOS or any other metrics) than the voice quality of path #2 because of the transcoding between compressions that has to be performed to mix the two media streams. When it is not necessary to mix media streams, a higher quality media stream may be sent to participants in the conference.

Figure 3:
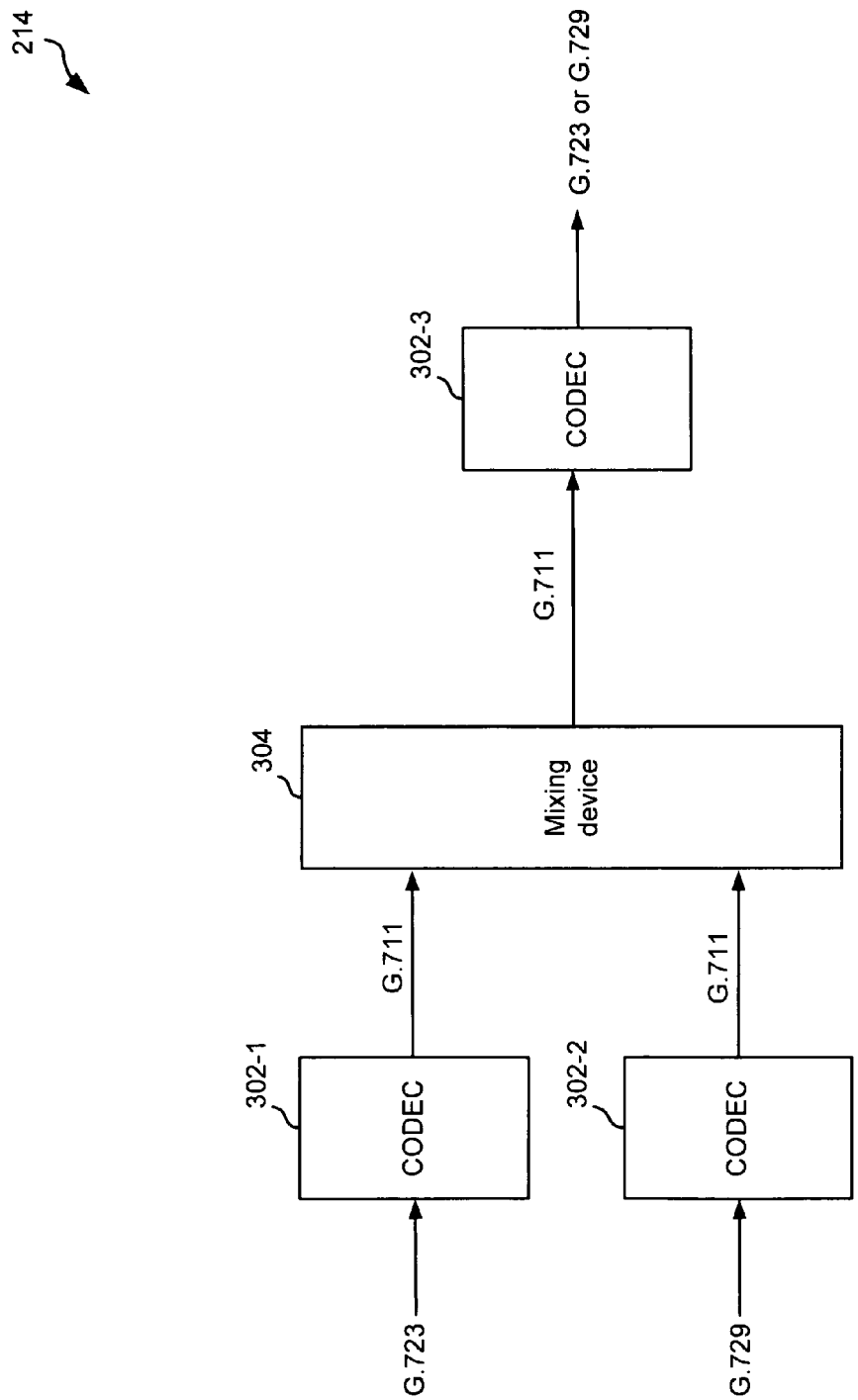
FIG. 3 shows an example of the mixing of media streams in a path #2 according to one embodiment of the present invention.

FIG. 3 depicts an embodiment of transcoding/mixing devise 214 according to one embodiment of the present invention. As shown, a media stream #1 is compressed using G.723 and a media stream #2 is compressed using G.729. The G.723 media stream is transcoded into a G.711 media stream using CODEC 302-1. Also, the G.729 media stream is transcoded into a G.711 media stream using CODEC 302-2. Both G.711 media streams are sent to mixing device 304, which mixes the media streams together. The mixed media stream is then sent to a CODEC 302-3. CODEC 302.3 converts the G.711 media stream to another compressed media stream. For example, the media stream may be transcoded into a G.723 or G.729 media stream. This may depend on the capabilities of the end device 104 the mixed media stream is being sent to and the characteristics of the network between the remote end device 104 and the mixer 304. Also, although two media streams are being described as being mixed, it will be recognized that any number of media streams may be mixed.

End devices 104 may be configured as half-duplex and/or full-duplex end devices. A half-duplex end device 104 is where at any given time a user can either speak or listen using end device 104. For example, when a user is speaking, the user cannot listen to other people speaking in the conference. A full-duplex device allows user to speak and listen at the same time. Floor control module 202 may use rules in deciding whether to switch between path #1 and path #2 based on whether users are using a half-duplex end device 104 or full-duplex end device 104.

Floor control module 202 may keep track of which users are using half-duplex and full-duplex end devices 104 and when push to talk signaling is received for requests to talk, floor control module 202 determines if the request to talk should be granted or denied. Also, floor control module 202 determines whether the output should be switched from path #1 to path #2, or vice versa.

For example, if a half-duplex user is currently speaking (has control of the floor) and another user issues a request to talk, then this request may be denied by floor control module 202. This is because a half-duplex user should not be interrupted because he/she may not be able to hear the second user. If a full-duplex user has the floor, floor control module 202 may allow other full-duplex users to speak. Also, floor control module 202 may allow the current speaker to speak uninterrupted if rules dictate.

Figure 4:
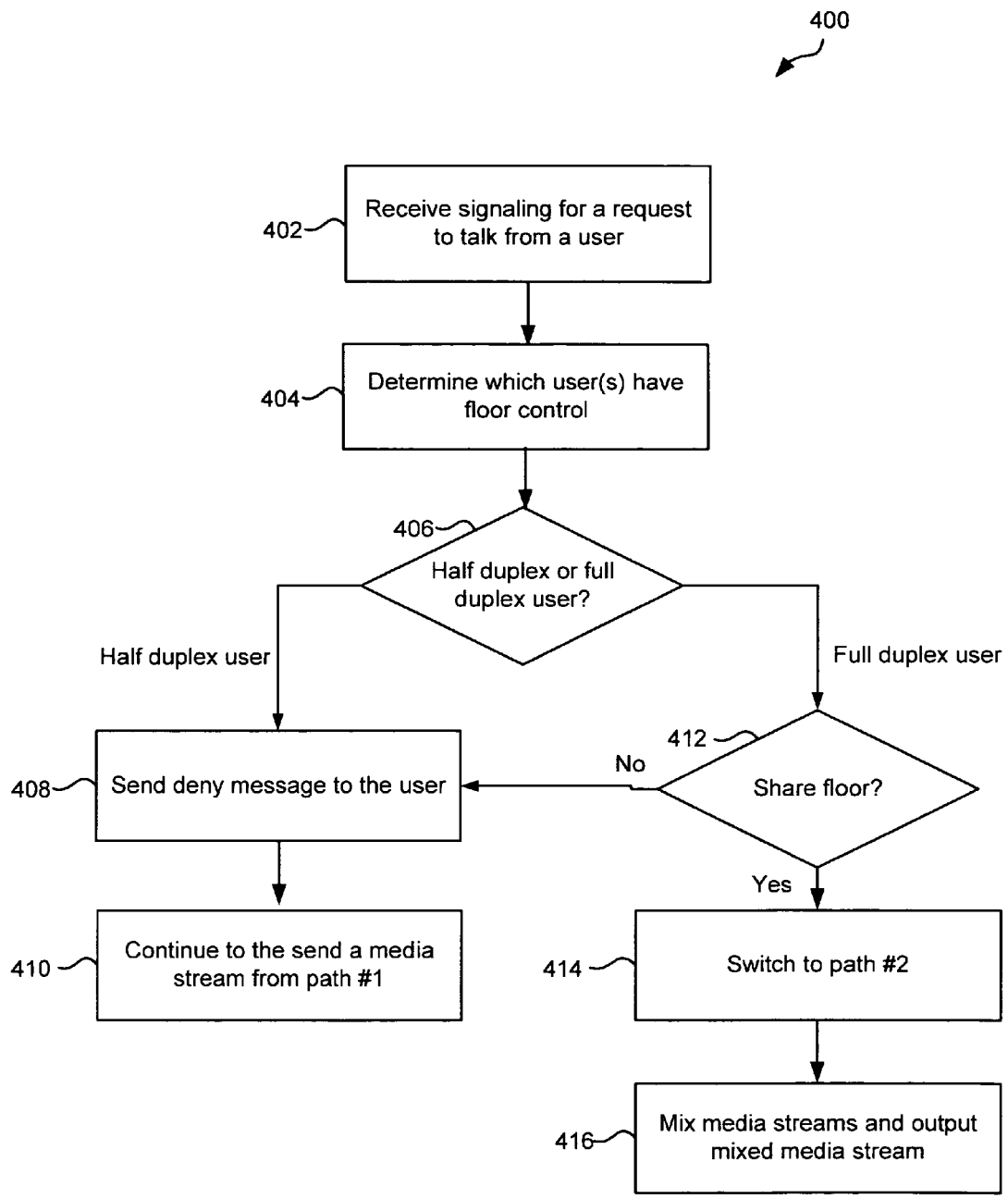
FIG. 4 depicts a simplified flow chart of a method for determining which path to output based on rules according to one embodiment of the present invention.

FIG. 4 depicts a simplified flow chart 400 of a method for determining which path to output based on rules according to one embodiment of the present invention. In step 402, floor control module 202 receives signaling for a request to talk from a user. A request to talk may be received when a user selects a push-to-talk option on end device 104.

In step 404, floor control module 202 determines which user or users is/are currently has/have floor control. It is assumed in this example that a single user has floor control. If multiple users have floor control, then, in one case, it may be assumed that the current speakers are allowed to speak with multiple users. However, there may be a limit on the number of speakers that are granted floor control so the following process may still be performed.

In step 406, floor control module 202 determines if the current speaker is a half-duplex user or a full-duplex user. A dynamic configuration database may be accessed to determine this.

In step 408, if the current speaker is a half-duplex user, then floor control module 202 sends a deny message for the request to talk to the user. This is because the current speaker is a half-duplex user and thus cannot listen while he/she is talking. Although this rule is provided, it will be understood that other rules may be contemplated, such as granting floor control to the user requesting to talk even though the half-duplex user will not be able to hear the requesting user. In step 410, floor control module 202 continues to send a media stream from path #1.

If the current speaker is a full-duplex user, step 412 determines if the floor should be shared (i.e., both speakers are allowed speak at the same time). For example, rules may be set such that some full-duplex users should not be interrupted. If the current speaker should not be interrupted, then the process performs steps 408 and 410 in which a deny message is sent to the requesting user and path #1 continues to be outputted.

However, if the floor can be shared, in step 414, floor control module 202 switches to path #2. In this case, the media streams of the current speaker and the requesting speaker are mixed and outputted in step 416. Accordingly, rules may be used to decide which paths should be outputted based on whether a user is a half-duplex user or full-duplex user. Although the above rules are described, it will be recognized that other rules may be appreciated.

Embodiments of the present invention provide many advantages. For example, voice quality may be optimized by switching between path #1 and path #2. When mixing is not necessary, a higher quality voice stream path #1 may be sent to participants in the conference. Also, rules may be provided that switch between path #1 and path #2 based on which users are speaking with a half-duplex or full-duplex device.

Although the invention has been described with respect to specific embodiments thereof, these embodiments are merely illustrative, and not restrictive of the invention. For example, although the following compressions are described above, other compressions will be appreciated.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. The terminology of conference and VTG are interchangeable; also the request to talk and the request for floor control are interchangeable.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:
    receiving, from at least one end device, signaling information based on a push to talk request from a participant during a conference among two or more participants, the signaling information indicating a request for floor control;
    determining how many of the two or more participants have floor control;
    determining, based on the signaling information and at least one rule, a signaling path for sending media to the participants in the conference, the signaling path characterized as having a first path or a second path, the first path including an unmixed path for sending media from one of the two or more participants and the second path including a mixed path for sending media from two or more of the two or more participants, the determination including:
    selecting the first path when only a first participant using a first end device has floor control and (a) the first end device is a half-duplex end device or (b) the first end device is a full-duplex end device and the first participant is identified as not to be interrupted by the at least one rule;
    selecting the second path when both the first participant and a second participant have floor control; and
    sending the first path or the second path based on the signaling path determination,
    wherein when the first path is sent, switching, while the conference is in session, from the first path to the second path when only the first participant has floor control, the first end device is a full-duplex end device, the first participant is identified as allowed to be interrupted by the at least one rule, and the received signaling information includes a request for floor control from the second participant, the second path including media from both the first and the second participants, wherein when the second path is sent, switching, while the conference is in session, from the second path to the first path when the received signaling information indicates that the second participant no longer requests floor control, and wherein in the second path media from the first participant and media from the second participant is transcoded from a first type of compression to a second type of compression, mixed, and transcoded back to the first type of compression.

2. The method of claim 1, wherein the media in the unmixed path is not transcoded from a first type of compression to a second type of compression.

3. The method of claim 1, further comprising introducing delay in the first path substantially equal to a second delay produced by a transcoding and mixing of the media stream performed in the second path.

4. The method of claim 1, wherein the signaling information comprises push to talk signaling information.

5. An apparatus configured to send media to participants in a conference, the apparatus comprising:
   one or more processors; and
   a memory containing instructions that, when executed by the one or more processors, cause the one or more processors to perform a set of steps comprising:
   receiving, from at least one end device, signaling information based on a push to talk request from a participant during a conference among two or more participants, the signaling information indicating a request for floor control;
   determining how many of the two or more participants have floor control;
   determining, based on the signaling information and at least one rule, a signaling path for sending media to the participants in the conference, the signaling path characterized as having a first path or a second path, the first path including an unmixed path for sending media from one of the two or more participants and the second path including a mixed path for sending media from two or more of the two or more participants, the determination including:
   selecting the first path when only a first participant using a first end device has floor control and (a) the first end device is a half-duplex end device or (b) the first end device is a full-duplex end device and the first participant is identified as not to be interrupted by the at least one rule;
   selecting the second path when both the first participant and a second participant have floor control; and
   sending the first path or the second path based on the signaling path determination,
   wherein when the first path is sent, switching, while the conference is in session, from the first path to the second path when only the first participant has floor control, the first end device is a full-duplex end device, the first participant is identified as allowed to be interrupted by the at least one rule, and the received signaling information includes a request for floor control from the second participant, the second path including media from both the first and the second participants, wherein when the second path is sent, switching, while the conference is in session, from the second path to the first path when the received signaling information indicates that the second participant no longer requests floor control, and wherein in the second path media from the first participant and media from the second participant is transcoded from a first type of compression to a second type of compression, mixed, and transcoded back to the first type of compression.

6. The apparatus of claim 5, wherein the media in the unmixed path is not transcoded from a first type of compression to a second type of compression.

7. The apparatus of claim 5, wherein the instructions cause the one or more processors to perform a further step comprising introducing delay in the first path substantially equal to a second delay produced by a transcoding and mixing of the media stream performed in the second path.

8. The apparatus of claim 5, wherein the signaling information comprises push to talk signaling information.

9. An apparatus for sending media to participants in a conference, the apparatus comprising:
   means for receiving, from at least one end device, signaling information based on a push to talk request from a participant during a conference among two or more participants, the signaling information indicating a request for floor control;
   means for determining how many of the two or more participants have floor control;
   means for determining, based on the signaling information and at least one rule, a signaling path for sending media to the participants in the conference, the signaling path characterized as having a first path or a second path, the first path including an unmixed path for sending media from one of the two or more participants and the second path including a mixed path for sending media from two or more of the two or more participants, the determination including:
   means for selecting the first path when only a first participant using a first end device has floor control and (a) the first end device is a half-duplex end device or (b) the first end device is a full-duplex end device and the first participant is identified as not to be interrupted by the at least one rule;
   means for selecting the second path when both the first participant and a second participant have floor control; and
   means for sending the first path or the second path based on the signaling path determination,
   wherein when the first path is sent, means for switching, while the conference is in session, from the first path to the second path when only the first participant has floor control, the first end device is a full-duplex end device, the first participant is identified as allowed to be interrupted by the at least one rule, and the received signaling information includes a request for floor control from the second participant, the second path including media from both the first and the second participants,
   wherein when the second path is sent, means for switching, while the conference is in session, from the second path to the first path when the received signaling information indicates that the second participant no longer requests floor control, and
   wherein in the second path media from the first participant and media from the second participant is transcoded from a first type of compression to a second type of compression, mixed, and transcoded back to the first type of compression.

10. The method of claim 1 further comprising tracking which for a plurality of participants are using end devices capable of full-duplex operation and which participants are using end devices capable of only half-duplex operation.

11. The apparatus of claim 7 wherein the instructions cause the one or more processors to perform a further step comprising tracking which for a plurality of participants are using end devices capable of full-duplex operation and which participants are using end devices capable of only half-duplex operation.

\* \* \* \* \*